Figure 1:
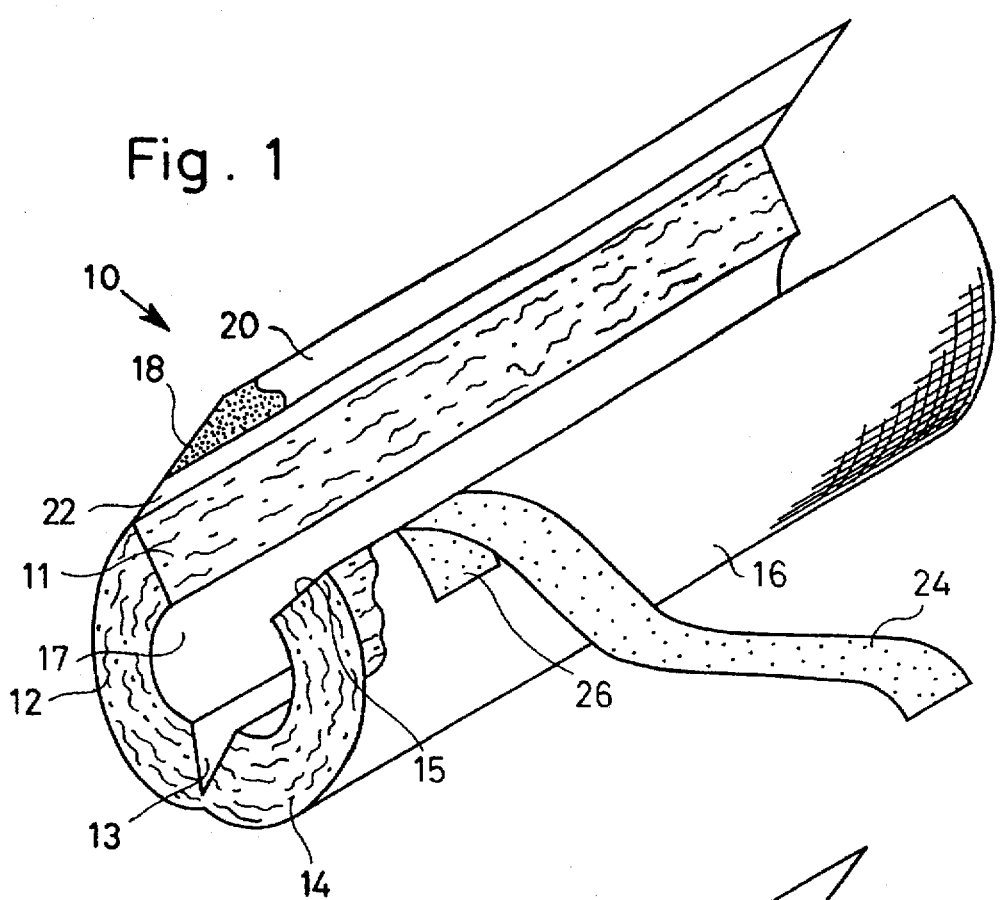

United States Patent [19]
Cridland et al.

[11] Patent Number: 5,690,147
[45] Date of Patent: Nov. 25, 1997

[54] METHOD AND APPARATUS FOR INSULATING

[75] Inventors: Ian Cridland, Vanloese, Denmark; A. M. Ettema, Herten, Netherlands; Kjeld Jepsen, Slangerup; Joergen Skjold Petersen, Roskilde, both of Denmark

[73] Assignee: Rockwool International A/S, Hedehusene, Denmark

[21] Appl. No.: 666,579

[22] PCT Filed: Jan. 11, 1995

[86] PCT No.: PCT/DK95/00020

§ 371 Date: Aug. 26, 1996

§ 102(e) Date: Aug. 26, 1996

[87] PCT Pub. No.: WO95/19523

PCT Pub. Date: Jul. 20, 1995

[30] Foreign Application Priority Data

Jan. 14, 1994 [DK] Denmark ..................................... 71/94

[51] Int. Cl.⁶ ........................................................ F16L 9/14
[52] U.S. Cl. ............................ 138/149; 138/147; 138/151
[58] Field of Search ................................. 138/149, 147, 138/151, 152, 156, 167; 122/494

[56] References Cited

U.S. PATENT DOCUMENTS

| | | |
|---|---|---|
| 3,989,104 | 11/1976 | Newton . |
| 4,605,043 | 8/1986 | Grenier ............................. 138/149 |
| 4,637,637 | 1/1987 | Adorjan ........................... 138/149 X |
| 4,664,182 | 5/1987 | Miwa . |
| 4,921,018 | 5/1990 | Dridi et al. ....................... 138/149 |
| 5,421,371 | 6/1995 | Lauer ............................... 138/149 X |
| 5,441,083 | 8/1995 | Korsgaard ........................ 138/149 |

FOREIGN PATENT DOCUMENTS

| | | |
|---|---|---|
| 87317 | 5/1959 | Denmark . |
| 152 303 | 2/1988 | Denmark . |
| 152 931 | 5/1988 | Denmark . |
| 153 417 | 7/1988 | Denmark . |
| 181 327 | 4/1936 | Germany . |
| 123644 | 12/1948 | Sweden . |
| WO 89/12199 | 12/1989 | WIPO . |
| WO 91/18237 | 11/1991 | WIPO . |

OTHER PUBLICATIONS

Oct. 1993, Teknisk Isolation; Klide, *Wetting of outdoor pipe conduits of mineral wool of results in large losses of energy*; Paulrud, Kaefer Isoleringsteknikk A/S; pp. 4–6 (English translation included).

*Primary Examiner*—Patrick Brinson
*Attorney, Agent, or Firm*—Merchant, Gould, Smith, Edell, Welter & Schmidt, P.A.

[57] ABSTRACT

A heat-insulating assembly (10) for insulating a surface of a tubular body (30) relative to the ambient air comprises a length of an annular heat-insulating body (12, 14) defining an inner cylindrical surface (17) and an outer cylindrical surface (16). A vapor-barrier layer is applied to and covers the outer cylindrical surface of the annular heat-insulating body. A through-going slit (11, 15) extends through the annular heat-insulating body (12, 14) in the entire length thereof for allowing the annular heat-insulating body (12–14) to be opened for positioning the annular heat-insulating body (10) circumferentially encircling the tubular body (30) so as to position the inner cylindrical surface (17) juxtaposed the surface of the tubular body (30). A strip (24) of a water transport-allowing material is further provided defining a width substantially smaller than the length of the annular heat-insulating body (10) and a length allowing the strip (24) to be arranged within the annular heat-insulating body (10) circumferentially encircling the tubular body (30) and extending through the slit (11, 15) of the annular heat-insulating body for presenting an exposed flap (26) of the strip (24) at the outer cylindrical surface (16) of the annular heat-insulating body (10) to be exposed to the ambient air for the evaporation of water transferred from the surface of the tubular body (30) to the flap (26) of the strip (24) through the strip.

39 Claims, 5 Drawing Sheets

METHOD AND APPARATUS FOR INSULATING

The present invention relates to the technical field of insulation. More precisely, the present invention relates to a technique involving insulating a surface of a tubular body by means of a heat-insulating body or layer which tubular body is exposed to accumulating condensed water such as a pipe having a surface temperature at or below the dew point of the ambient air.

In numerous applications, a body is kept at a temperature at or below the dew point of the ambient air, which body may e.g. constitute a pipe of a freezing or refrigerator system or of an air-conditioning system, or a pipe supplying cold water. Alternatively, the body may e.g. constitute a structure of a building which is exposed to a low temperature from the environment, whereas, in the present context, the ambient air refers to the heated air of the building, which ambient air is typically heated to a temperature above the temperature of the environment. The ambient air also contains an increased amount of moisture as compared to the environment. Furthermore, it has been realized that even heat-insulating layers of pipes conducting heated water may in some instances be exposed to accumulating water as described in an article in the Norwegian magazine "Kulde" No. 5, October 1993, including a special issue relating to the technical field: "Teknisk Isolation" or in English language: "Technical insulating technique", page 4–6. According to the realization described in the above magazine, pipes normally conducting heated water or even steam may, provided the pipes are covered by an insulating layer and providing the pipe and the insulating layer are exposed to the environment such as rain, snow, fog, etc., generate accumulation of condensed water within the insulating layer under certain conditions such as reduced flow of hot water or steam through the pipe causing cooling of the pipe and exposure of the insulating layer to rain or snow. In the below description, reference is, however, solely made to a body having a surface temperature at or below the dew point of the ambient air which, however, is by no means to be construed limiting the technical field of the present invention to insulating surfaces of bodies having surface temperatures at or below the dew point of the ambient air and excluding equivalent technical areas such as the above described pipes conducting hot water or steam which as described above, may also give origin to the accumulation of condensed water within the heat-insulating layer of the pipes. The insulating layer may comprise mineral wool, such as glass wool, rock wool or slag wool, or may alternatively comprise foamed plastics or elastomeric materials, such as closed or open cells of foamed material, e.g. polyurethane foam, or may further alternatively comprise combinations of the materials mentioned above.

Hitherto, it has been attempted to block transfer of moisture from the ambient air to the body in question having a surface temperature at or below the dew point of the ambient air by providing a moisture-transfer blocking foil, such as an aluminum or plastic foil, which serves to block the diffusion of moisture into the insulating layer and further into contact with the surface of the body having a surface temperature at or below the dew point of the ambient air.

Various problems, however, occur, such as problems relating to foil junctions and perforation of the foil constituting the moisture or water transport-blocking barrier, and these problems in some instances, in particular in connection with non-water repellent products or materials, result in moisture penetrating into the insulating layer and causing generation of condensed water at the surface of the body. The generation of condensed water at the surface of the body, firstly, results in a reduction of the insulating property of the insulating layer, and may, secondly, cause corrosion and/or deterioration of the surface of the body or of the body itself and/or of the insulating layer.

From international patent application No. PCT/DK91/00132, publication No. WO 91/18237, an insulating system for insulating e.g. a pipe supplying cold water is described including a condensed water draining system. This insulating system is of an elaborated structure, which renders the insulating system complex and expensive. A serious drawback relating to the insulating system known from the above-mentioned international patent application relates to the fact that the insulating system is extremely slowly responding to the generation of condensed water at the surface of the body which is insulated by means of the insulating system since the insulating system accumulates a fairly large amount of condensed water before the draining system for draining the condensed water becomes operative.

An object of the present invention is to provide a simple technique for removing condensed water from a surface of a tubular body having a surface temperature at or below the dew point of the ambient air, which technique, on the one hand, is swift responding to the presence of condensed water, and, on the other hand, is adaptable to specific application requirements, such as requirements relating to the water-removal capacity requested, the moisture content of the ambient air, and further the temperature difference between the surface temperature of the body and the temperature of the ambient air.

A feature of the present invention is to provide a novel technique rendering it possible to provide insulating systems from an integral heat-insulating assembly, still fulfilling specific requirements relating to the water-removal capability requested, the moisture content of the air, and further the temperature difference between the surface temperature of the body and the temperature of the ambient air.

An advantage of the present invention is the fact that the heat-insulating assembly is readily and easily applicable for providing adequate and sufficient removal of condensed water from a tubular body, such as a pipe.

The above object, the above feature and the above advantage, together with numerous other objects, advantages and features, which will be evident from the below detailed description of preferred embodiments of the device and the insulating assembly according to the present invention, are, in accordance with a first aspect of the present invention, obtained by means of a heat-insulating assembly for insulating a surface of a tubular body relative to the ambient air, comprising:

a length of an annular heat-insulating body defining an inner cylindrical surface and an outer cylindrical surface, a vapour-barrier layer being applied to and covering the outer cylindrical surface of the annular heat-insulating body, and a through-going slit extending through the annular heat-insulating body in the entire length thereof so as to allow the annular heat-insulating body to be opened for positioning the annular heat-insulating body circumferentially encircling the tubular body so as to position the inner cylindrical surface juxtaposed the surface of the tubular body, and a strip of a water transport-allowing material defining a width substantially smaller than the length of the annular heat-insulating body and a length allowing the strip to be arranged within the annular heat-insulating body circumferentially encircling the tubular body and extending through the slit of the annular heat-insulating body for presenting an exposed flap of the strip at the outer cylindrical surface of the annular heat-insulating body to be exposed to the ambient air for the evaporation of water transferred from the surface of the tubular body to the flap of the strip through the strip of the water transport-allowing material.

According to the present invention, the strip of water transport-allowing material is of a reduced size as compared to the draining system of the insulating system described in the above mentioned international patent application. Thus, it has been realized that the draining of condensed water from the surface of the tubular body which is insulated by means of an insulating layer such as an annular heat-insulating body is delayed until the water transport-allowing material is entirely soaked with water. Therefore, provided a large amount of water transport-allowing material is used, a fairly large amount of water has to be accumulated by the water transport-allowing material before the condensed water draining effect occurs. The accumulation of a fairly large amount of water within the water transport-allowing material is of course less advantageous since the presence of a fairly large amount of condensed water may, firstly, deteriorate the material of the tubular body such as the pipe and, secondly, deteriorate the insulating material or reduce the heat-insulating properties of the heat-insulating materials.

In the present context, the expression "the water transport-allowing material" means any material allowing the tranfer or transport of water through the material from the surface of the tubular body, through the annular heat-insulating body and to the ambient air. Preferably, the material constituting the water transport-allowing material exibit characteristics promoting or accelerating the transfer of water through capillary action, through suction, through hygroscopic characteristics of the material or any other action or through any other characteristic of the material having chemical or physical origin.

According to presently preferred embodiment of the heat-insulating assembly according to the first aspect of the present invention, the water transport-allowing material is preferably a capillary suction material rendering it possible to position the assembly according to the first aspect of the present invention in any arbitrary orientation relative to the vertical orientation as the condensed water is removed from the surface of the body in question through capillary suction irrespective of the gravitational force to which the condensed water is exposed.

The heat-insulating assembly according to the present invention may be produced from any insulating material such as mineral wool, glass wool, rockwool or slack wool, foamed plastics material or elastomeric materials, such as closed or open cells of foamed material, e.g. polyurethane foam, or even combinations of the above materials. Preferably, the annular heat-insulating body of the heat-insulating assembly according to the present invention prefebly comprises mineral fibers and is preferably made from mineral fibers.

In order to prevent that vapour or water may permeate through the slit extending through the annular heat-insulating body, the heat-insulating assembly according to the present invention preferably further comprises a sealing means for sealing the through-going slit of the annular heat-insulating body. The sealing means may be constituted by e.g. a length of a vapour-impermeable adhesive tape such as an aluminum tape provided with an adhesive surface coating. Alternatively, according to a advantageous embodiment of the heat-insulating assembly according to the present invention, the sealing means is constituted by a flap of the vapour barrier layer extending along the through-going slit of the annular heat-insulating body and has an adhesive coating for adhering to the vapour-barrier layer in overlapping relationship therewith along the through-going slit of the annular heat-insulating body.

According to a further embodiment of the heat-insulating assembly according to the present invention, the heat-insulating assembly comprises a perforated foil of a vapour-barrier material to be applied to the vapour-barrier layer covering the outer cylindrical surface of the annular heat-insulating body so as to expose the flap of the strip of the water transport-allowing material through perforations of the perforated foil. Alternatively, the flap of the strip exposed to the ambient air may freely extend from the outer cylindrical surface of the annular heat-insulating body, provided no risk of mechanically contacting and destroying the flap exists.

In a further advantageous embodiment of the heat-insulating assembly according to the present invention constituting an integral unitary structure to be applied to the tubular body to be insulated by means of the heat-Insulating assembly, the strip defines opposite first and second ends, which first end is adhered to the annular heat-insulating body at the through-going slit of the annular heat-insulating body, and which second end defines the flap of the strip for the evaporation of water transferrred from the surface of the tubular body to the flap of the strip through the strip of the water transport-allowing material.

The above object, the above feature and the above advantage, together with numerous other objects, advantages and features, which will be evident from the below detailed description of preferred embodiments of the present invention, are, in accordance with a second aspect of the present invention, provided by means of a method of insulating a surface of a tubular body relative to the ambient air and removing condence water from the surface of the tubular body, comprising:

providing a heat-insulating assembly for insulating the surface of the tubular body, comprising:

a length of an annular heat-insulating body defining an inner cylindrical surface and an outer cylindrical surface, a vapour-barrier layer being applied to and covering the outer cylindrical surface of the annular heat-insulating body, and a through-going slit extending through the annular heat-insulating body in the entire length thereof so as to allow the annular heat-insulating body to be opened for positioning the annular heat-insulating body circumferentially encircling the tubular body so as to position the inner cylindrical surface juxtaposed the surface of the tubular body, and a strip of a water transport-allowing material defining a width substantially smaller than the length of the annular heat-insulating body and a length allowing the strip to be arranged within the annular heat-insulating body circumferentially encircling the tubular body and extending through the slit of the annular heat-insulating body for presenting an exposed flap of the strip at the outer cylindrical surface of the annular heat-insulating body to be exposed to the ambient air for the evaporation of water transferred from the surface of the tubular body to the flap of the strip through the strip of the water transport-allowing material, and arranging the heat-insulating assembly circumferentially encircling the tubular body so as to arrange the strip of the water transport-allowing material circumferentially encircling the surface of the tubular body, and so as to expose the flap of the strip at the outer cylindrical surface covered by the vapour-barrier layer for allowing water transferred from the surface of the tubular body through the water transport-allowing material of the strip to the flap to be evaporated.

The method according to the second aspect of the present invention may advantageously comprise any of the above described features of the heat-insulating assembly according to the first aspect of the present invention. Thus, the slit is preferably in accordance with an advantageous embodiment of the method according to the second aspect of the present invention sealed by means of a sealing means which as stated above may be constituted by a separate water-impermeable adhesive material or alternatively a flap of the vapour-barrier layer.

The slit extending through the annular heat-insulating body of the heat-insulating assembly according to the first aspect of the present invention and of the heat-insulating assembly to be used in accordance with the method according to the second aspect of the present invention may have any geometrical shape such as a curved configuration provided the slit extends in the entire length of the annular heat-insulating body allowing the annular heat-insulating body to be positioned circumferentially encirling the tubular body. Preferably, however, the slit is of a rectalinear configuration defining a slit extending length-wise along the annular heat-insulating body.

Figure 2:
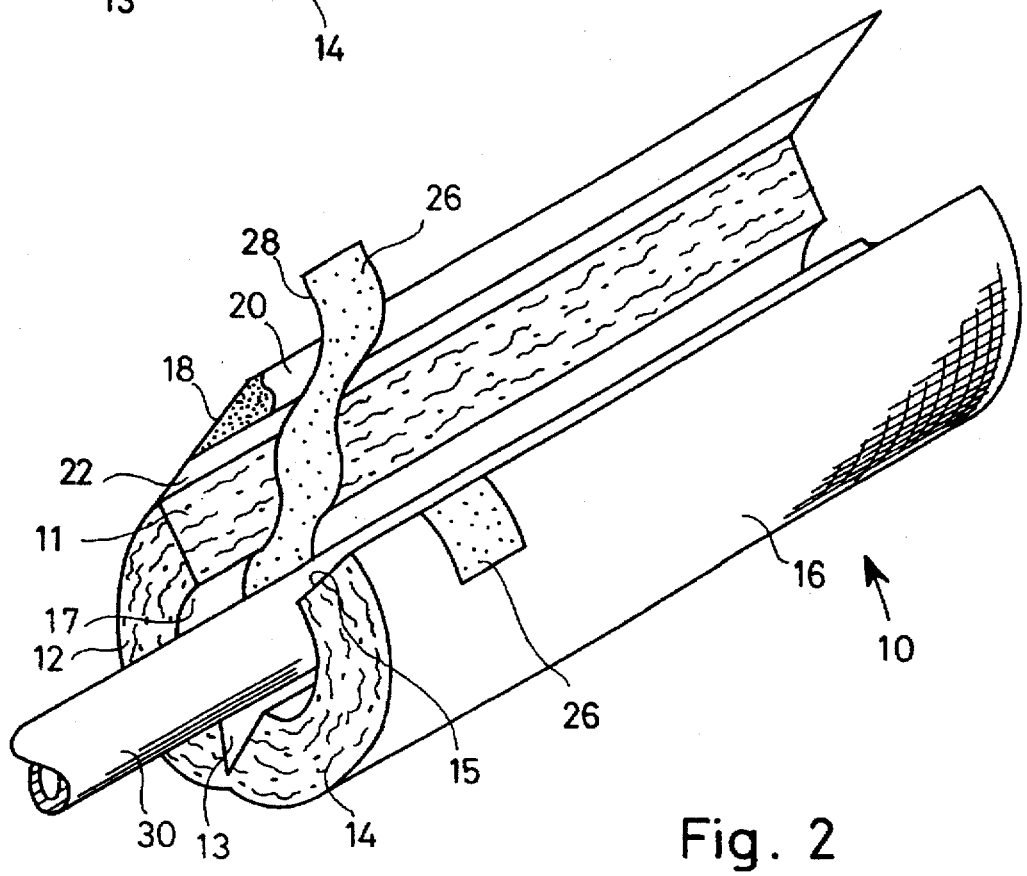
Figure 3:
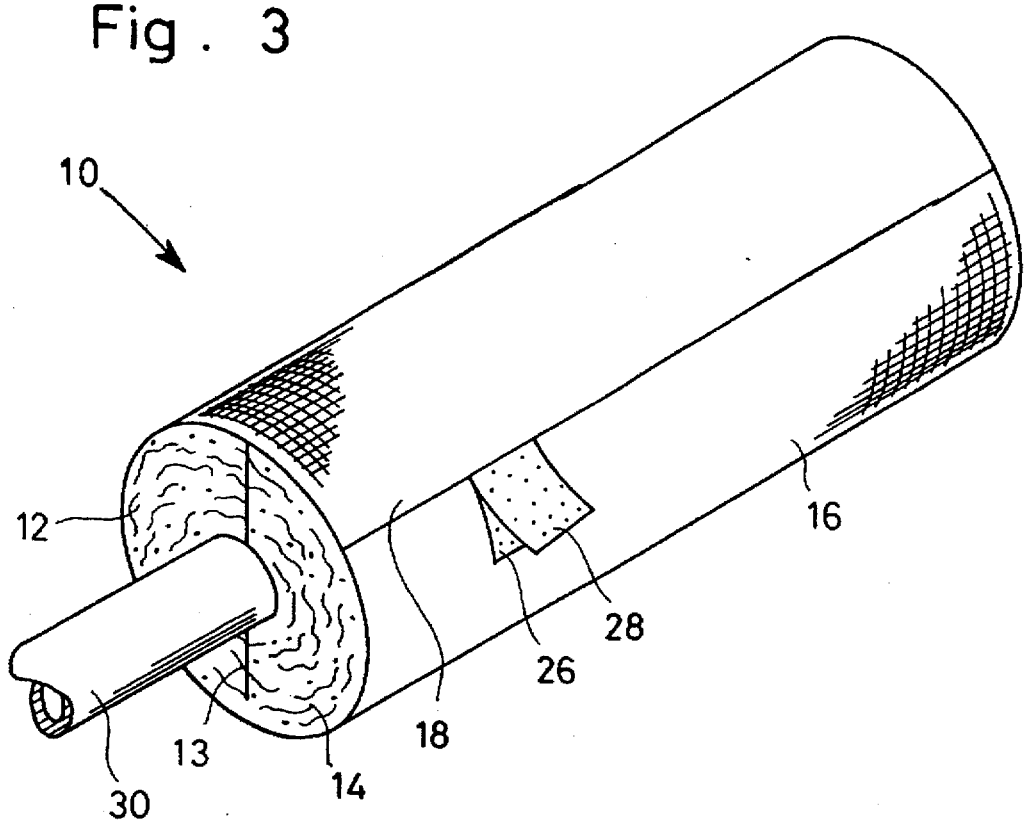
Figure 4:
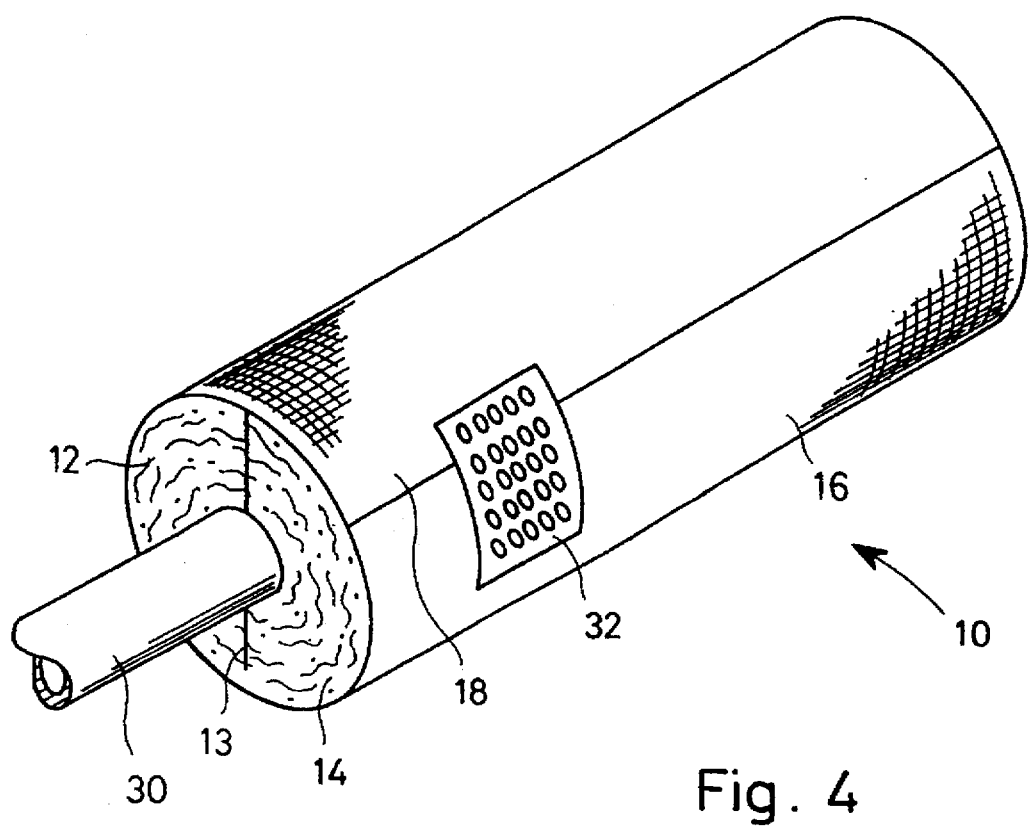
Figure 5:
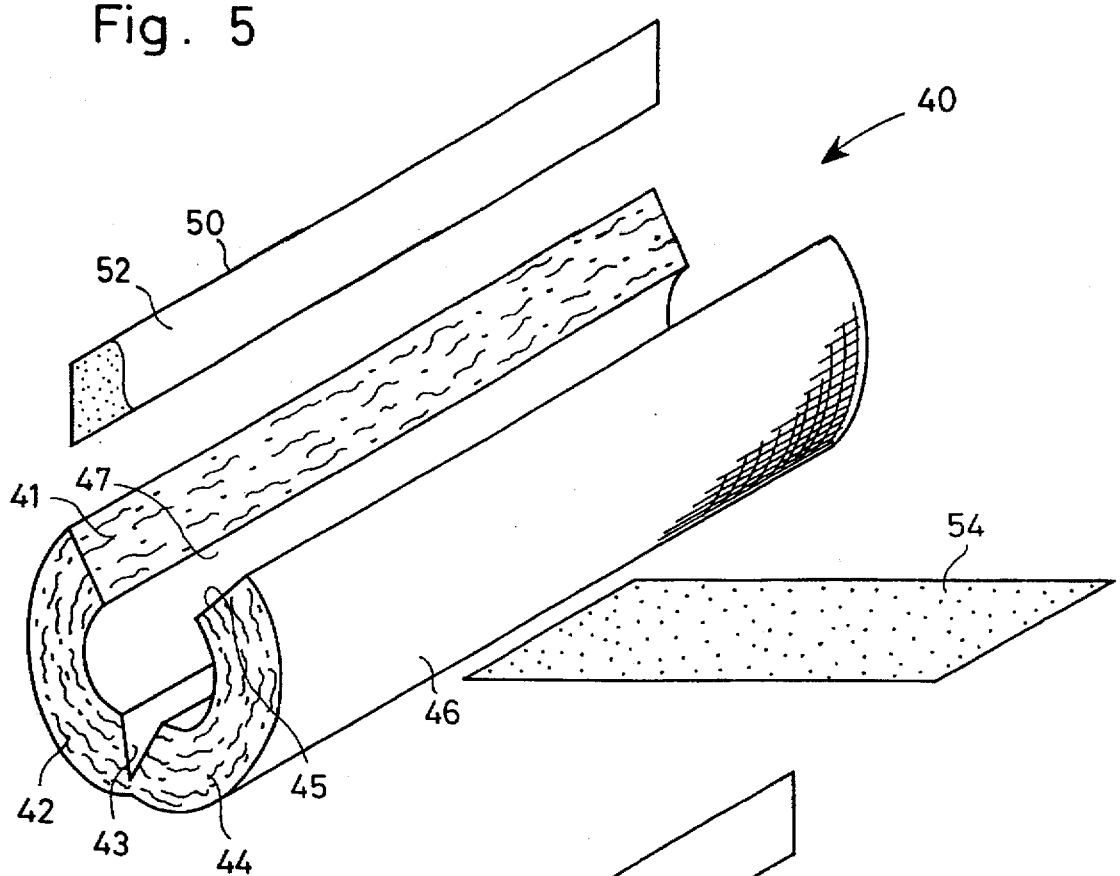
Figure 6:
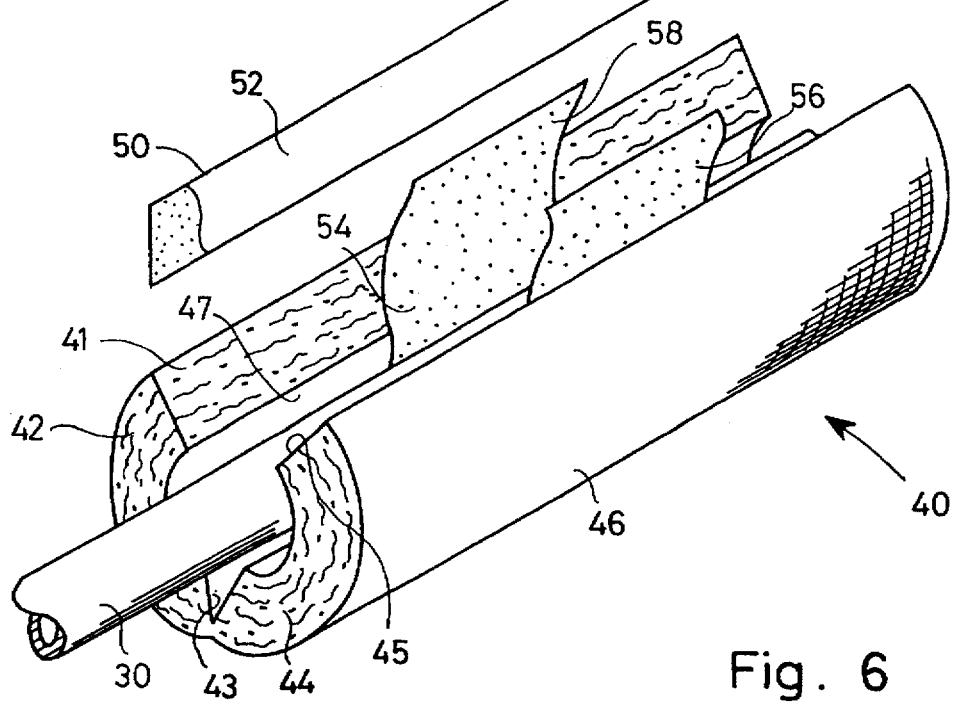
Figure 7:
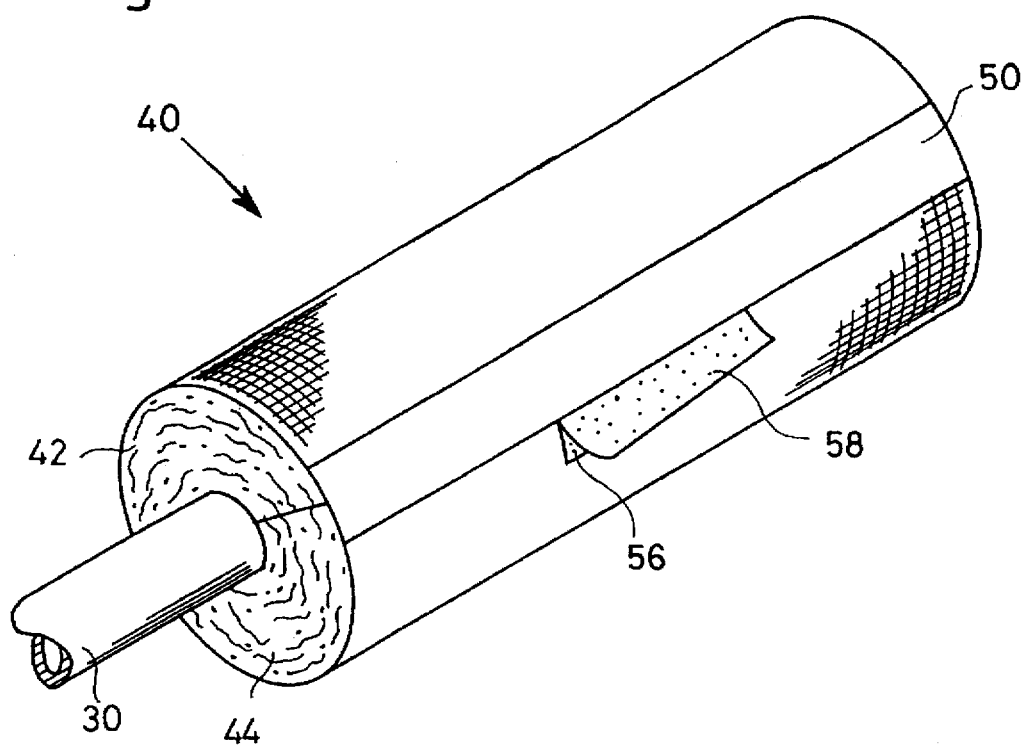
Figure 8:
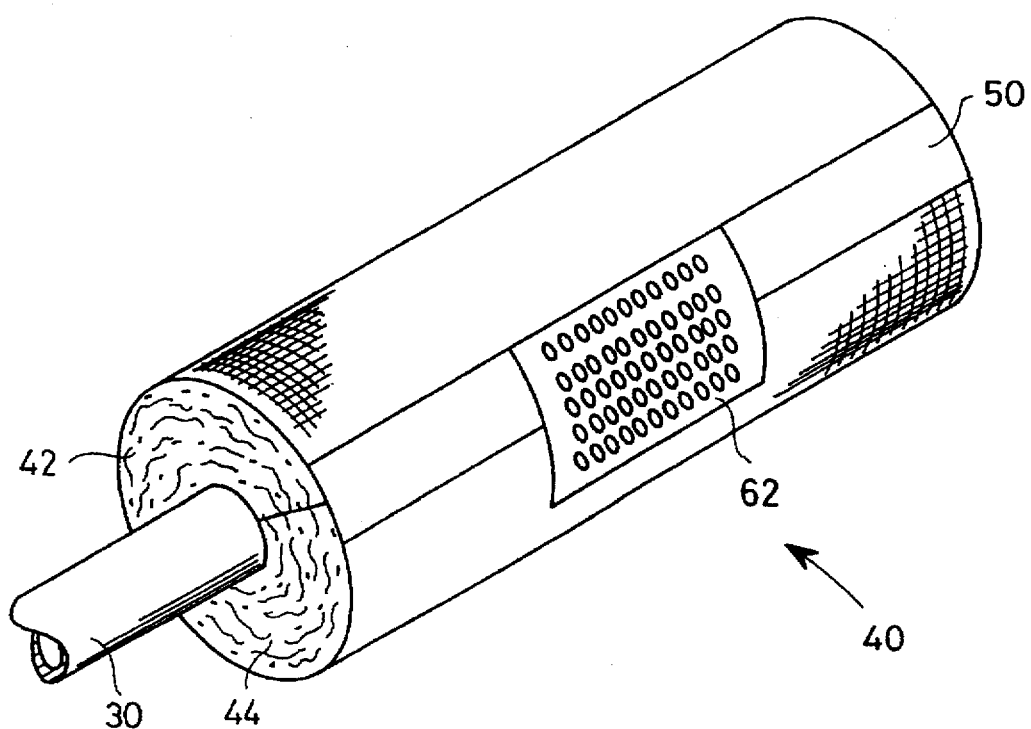
Figure 9:
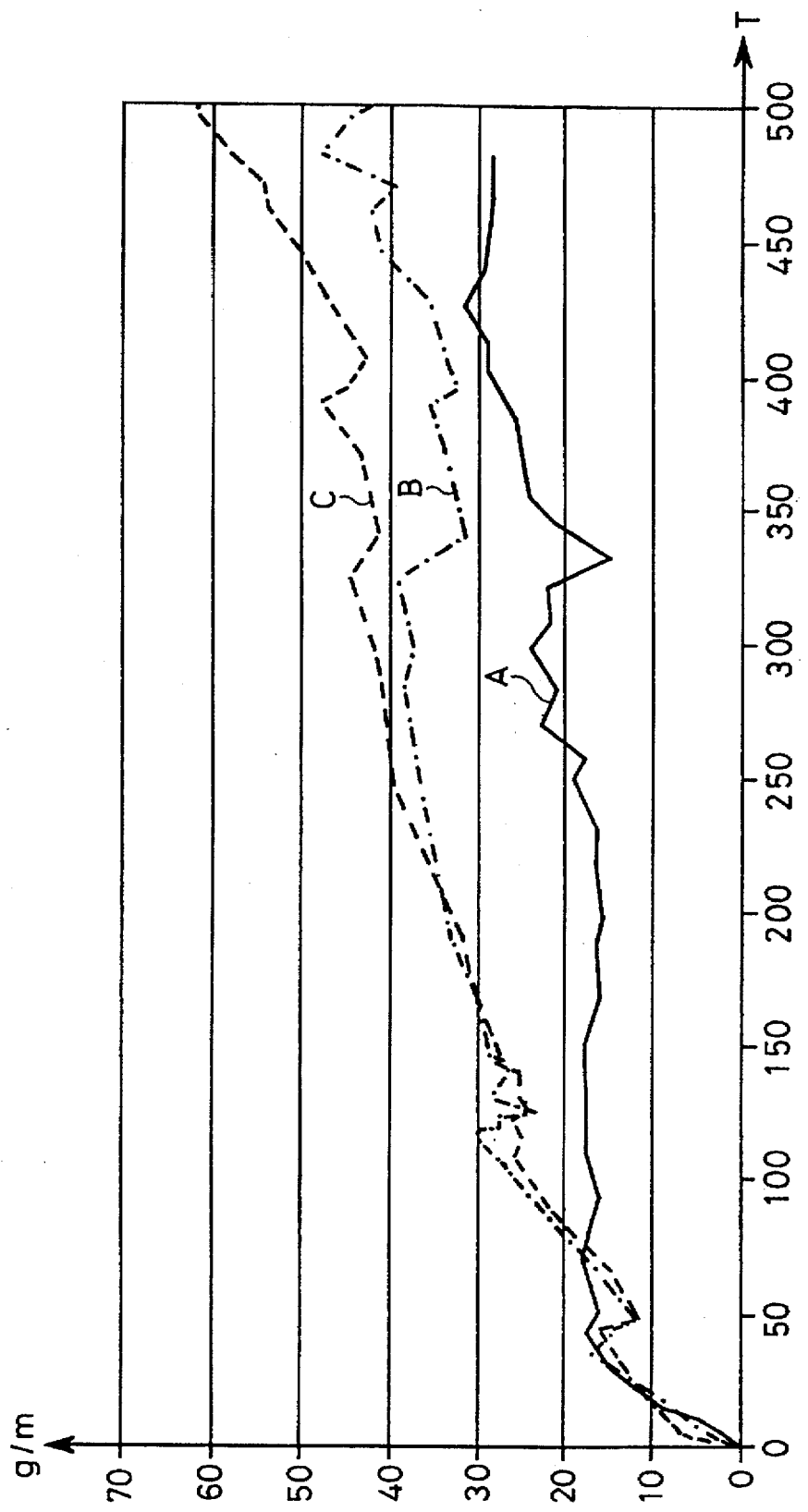

The present invention will now be further described with reference to the drawings, in which FIG. 1 is a perspective and schematic view of a first and presently preferred embodiment of a heat-insulating assembly to be used for insulating a pipe or a tubular body, and including a strip of a water transport-allowing material for the removal of condensed water from the outer surface of the pipe or tubular body, which is insulated by means of the heat-insulating assembly, FIGS. 2, 3, and 4 are perspective and schematic views similar to the view of FIG. 1, illustrating three steps of applying the heat-insulating assembly shown in FIG. 1 to a pipe, FIG. 5 is a perspective and schematic view similar to the view of FIG. 1 of a second embodiment of the heat-insulating assembly according to the present invention, FIGS. 6, 7 and 8 are perspective and schematic view similar to the views of FIGS. 2, 3, and 4, respectively, illustrating three steps of applying the heat-insulating assembly shown in FIG. 4 to a pipe, and FIG. 9 is a diagramatic view illustrating the effect of draining condensed water from a pipe insulated by means of the heat-insulating assembly according to the present invention, as compared to the effect of draining condensed water from the same pipes insulated by means of alternative heat-insulating assemblies.

In FIG. 1, a first and presently preferred embodiment of a heat-insulating assembly according to the present invention is shown, designated the reference numeral 10 in its entirety. The heat-insulating assembly 10 basically comprises an annular heat-insulating body constituted by a mineral wool body, such as a glass wool, rock wool or slag wool body composed of basically two segments 12 and 14, together constituting the annular heat-insulating body to be arranged circumferentially encircling a tubular body, such as a pipe, as will be described in greater details below with reference to FIGS. 2-4. The segments 12 and 14 are produced from an annular integral body which is cut lengthwise along a rectilinear slit producing two surfaces 11 and 15 to be contacted with one another as the segments 12 and 14 are positioned circumferentially encircling the above-mentioned tubular body. The segments 12 and 14 are further separated from one another through a partial slit 13 extending partly into the wall of the annular heat-insulating body. The slit 13 is preferably produced in the same cutting operation, in which the slit producing the surfaces 11 and 13 is also produced.

The annular heat-insulating body comprising the segments 12 and 14 defines an inner surface, designated the reference numeral 17, which inner surface in the intentional application of the assembly 10 is arranged juxtaposed the outer surface of the above-mentioned tubular body. The annular heat-insulating body comprising the segments 12 and 14 also defines an outer surface contituting an outer cylindrical surface, as the heat-insulating body comprising the segments 12 and 14 is arranged circumferentially encircling the above-mentioned tubular body. The outer surface of the heat-insulating body is completely covered by an aluminium foil 16, which serves the purpose of providing a vapour and water barrier preventing vapour and water from permeating into the heat-insulating material of the segments 12 and 14 of the heat-insulating body.

The aluminium covering or foil 16 also comprises a flap 22, which protrudes beyond the surface 11 of the segment 12 and which is provided with an adhesive layer, e.g. an adhesive tape 18, provided with a release paper 20 and serving the purpose of adhering the flap 22 to the aluminium foil 16 at the surface 15 in overlapping relation.

The heat-insulating assembly 10 further comprises a strip 24 of a water transport-allowing material, such as a capillary suction material, which strip is of a width substantially smaller than the overall length of the heat-insulating body comprising the segments 12 and 14. The strip 24 is, through an end flap 26, adhered to the outer surface of the aluminium covering 16 at a position adjacent to the surface 15.

FIGS. 2-4 illustrate three steps of arranging the heat-insulating assembly 10 relative to a tubular body constituted by a pipe 30, which e.g. constitutes a cooling pipe of a freezing or refrigerator system or of an air-conditioning system, or a pipe supplying cold water. Thus, the pipe 30, in most instances, serves the purpose of transmitting a fluid, which has a fairly low temperature, at least a temperature which is somewhat lower than the temperature of the ambient air. The fluid may e.g. constitute a cooling or freezing fluid, or cold water. Alternatively, the pipe 30 may constitute a pipe of the type described in the above-mentioned article.

In order to prevent that the fluid transmitted through the pipe 30 is heated, provided the fluid is a freezing or cooling fluid, the heat-insulating assembly 10 is applied. Initially, the free end of the strip 24 is positioned within the through-shaped inner space defined within the segments 12 and 14 of the heat-insulating body of the heat-insulating assembly 10. Thereafter, the segments 12 and 14 are separated from one another so as to allow the heat-insulating assembly 10 to be positioned circumferentially encircling the outer surface of the pipe 30. The heat-insulating assembly 10 is positioned circumferentially encircling the pipe 30 so as to cause said strip 24 to contact the outer surface of the pipe 30 for establishing facial contact between the strip 24 and the outer surface of the pipe 30, and further, as is evident from FIG. 2, for presenting a flap 28 extending freely out through the slit defined between the surfaces 11 and 13.

In the step shown in FIG. 3, the segments 12 and 14 are pressed firmly against one another, causing the surfaces 11 and 13 of the segments 12 and 14, respectively, to contact one another, and also causing the slit 13 to be closed. Thereupon, the adhesive tape 18 of the flap is contacted with the outer surface of the aluminium foil 16 of the segment 14 adjacent to the above-mentioned slit defined between the surfaces 11 and 13 for sealing the slit, after the release paper 20 intitially covering the adhesive material of the adhesive tape 20 is removed. As the flap 22 is contacted in overlapping relationship with the aluminium foil 16 of the segment 14 adjacent to the above-mentioned slit, the flap 28 of the strip 24 is exposed in a position overlapping the flap 26.

Finally, as shown in FIG. 4, a perforated adhesive foil 32 is positioned covering the flaps 26 and 28, still presenting exposed areas of the flap 28 to the ambient air through the perforations of the tape In FIG. 5, a second embodiment of the heat-insulating assembly according to the present invention is shown, designated the reference numeral 40 in its entirety. The second embodiment 40 differs from the above-described embodiment 10 in that the second embodiment is composed of a plurality of separate components, whereas the first embodiment 10 is a unitary structure to be arranged circumferentially encircling the pipe 30 without the use of additional components apart from the perforated tape 32.

The second embodiment 40 comprises two segments 42 and 44 of an annular heat-insulating body similar to the segments 12 and 14, respectively, described above. The segments 42 and 44 present surfaces 41 and 45 similar to the surfaces 11 and 15, respectively, described above, and are further separated through a partial slit 43 similar to the slit described above. The annular heat-insulating body comprising the segments 42 and 44 presents an inner surface 47 and an outer surface, which is covered by a vapour- and water-impermeable covering 46, such as an aluminium foil.

Whereas the aluminium foil 16 of the first embodiment 10 provided a flap 22, the covering 46 solely covers the outer surface of the segments 42 and 44 of the annular heat-insulating body without producing any flap. Also, the strip 24 of the first embodiment 10, described above with reference to FIGS. 1-4, is, in the second embodiment 40, substituted by a separate strip 54 of a somewhat larger width. The assembly 40 further comprises a length of an adhesive tape 50 provided with a release paper 52.

The heat-insulating assembly 40 is arranged in accordance with the technique disclosed in FIGS. 6-8. Intitially, the strip 54 is positioned circumferentially encircling the outer surface of the pipe 30 or, alternatively, positioned within the through-shaped inner space defined within the heat-insulating body comprising the segments 42 and 44, whereupon the heat-insulating body is positioned circumferentially encircling the outer surface of the pipe 30. As is evident from FIG. 6, the strip 54 presents two flaps 56 and 58 extending out through the slit extending lengthwise through the annular heat-insulating body comprising the segments 42 and 44 and defining the surfaces 41 and 45.

Thereupon, the segments 42 and 44, as is evident from FIG. 7, are pressed firmly against the outer surface of pipe 30 in a step similar to the step described with reference to FIG. 3 for contacting the surfaces 41 and 45 with one another, and for closing the slit 43. Similar to the technique described above with reference to FIG. 3, the adhesive tape 50 is subsequently applied to the outer surface of the covering 46 for sealing the slit defined between the surfaces 41 and 45, and further for maintaining the heat-insulating assembly 40 in the intentional position shown in FIG. 7. As is evident from FIG. 7, the outer flaps 56 and 58 of the strip 54 are exposed to the ambient air at the outer surface of the covering 46.

In a final step, shown in FIG. 8, a perforated tape 62 similar to the tape 32 is applied to the outer surface of the covering 46 and also covering the flaps 56 and 58, still presenting areas of the flap 58 to the ambient air through the perforations of the perforated tape 52.

The strips 14 and 54 of the above-described first and second embodiments 10 and 40, respectively, serve the purpose of draining condensed water from the outer surface of the pipe 30, as the coverings 16 and 46 are not able to provide hermetic sealing of the annular heat-insulating body relative to the environment and the ambient air. Therefore, moisture or water may permeate through the heat-insulating material of the annular heat-insulating body of the heat-insulating assembly, causing the degeneration of condensed water at the outer surface of the pipe 30. The degeneration of condensed water at the outer surface of the pipe 30 may, firstly, dependent on the properties and the specific material of the annular heat-insulating body, result in the reduction of the insulating property of the annualar heat-insulating body, as the condensed water may, in some instances, be absorbed by the material of the annular heat-insulating body and produce an increase of the heat-transport properties of the material of the annular heat-insulating body, and consequently reduce the insulating property of the heat-insulating assembly. Secondly, the condensed water may cause corrosion and/or deterioration of the pipe 30 and, in some instances, also of the material of the annular heat-insulating body of the heat-insulating assembly. For draining any condensed water from the outer surface of the pipe 30, the strips 14 and 54 are provided in accordance with the teachings of the present invention.

The strips 24 and 54 serve three purposes: firstly, the purpose of contacting a surface area of the outer surface of the pipe 30, which area is preferably an area positioned at a minimum height above ground level, secondly, the purpose of conducting condensed water from the part of the strip contacting the outer surface of the pipe to the flaps exposed at the outer surface of the vapour and water barrier of the heat-insulating assembly, and, thirdly, the purpose of causing condensed water to evaporate from the flaps exposed to the ambient air.

Contrary to the prior art condensed-water draining technique, the heat-insulating assembly according to the present invention comprises a fairly small strip of water transport-allowing material, since it has been realized that the prior art technical solution, as described in the above-mentioned international patent application, does not function entirely satisfactory. Thus, it has been realized that the draining and evaporation properties of the prior art structures are somewhat inadequate, since the water transport-allowing material of the prior art structures, which material covers the overall surface of the pipe insulated by means of the prior art structures, has to be completely soaked with water before any evaporation of condensed water from the exposed part of the water transport-allowing material is generated. Thus, the prior art structures unintentionally accumulate a fairly large amount of water, which inadvertently influences the operation and properties of the prior art structures.

The above realization is illustrated in FIG. 9, which presents a diagramme illustrating three curves: A, B, and C. The curve A illustrates the amount of water accumulated within a heat-insulating assembly implemented in accordance with the above-described first and presently preferred embodiment 10, which assembly was arranged circumferentially encircling a pipe, through which cold water was transferred. The amount of water accumulated per 1 m of the heat-insulating assembly was determined periodically within a time period of 540 days represented along the abscissa axis of the diagramme. The curve B similarly illustrates the amount of water accumulated per 1 m of a heat-insulating structure of the type described in the above-mentioned international patent application and applied to the very same pipe as the heat-insulating assembly implemented in accordance with the teachings of the present invention. The curve C similarly illustrates the amount of water accumulated per 1 m of a foamed insulating layer of the type Armaflex™, and also applied to the very same pipe as the heat-insulating assembly implemented in accordance with the teachings of the present invention and the heat-insulating structure according to the above-mentioned international patent application.

From FIG. 9, it is evident that the heat-insulating assembly implemented in accordance with the teachings of the present invention, so to speak, starts functioning after approximately 40–50 days, as the amount of water accumulated within the heat-insulating assembly is fairly constant from that time until the end of the test/experiment after 500 days. The heat-insulating structure according to the above-mentioned international patent application, like the foamed insulating structure, constantly increases the amount of water accumulated within the structures for approximately 200 days, whereupon the heat-insulating structure according to the above-mentioned international patent application starts draining a fairly small amount of water from the pipe, whereas the Armaflex™ heat-insulating structure still increases the amount of water accumulated within the heat-insulating structure.

Example 1

A heat-insulating assembly was produced in acordance with the first and presently preferred embodiment 10, described above with reference to FIGS. 1–4, from the following components: The annular heat-insulating body was made from rock wool fibers. The annular heat-insulating body comprising the segments 12 and 14 defined an overall length of 50 cm, an inner diameter of 5 cm, and an outer diameter 10 cm. The slits defining the surfaces 11 and 15, and the slit 13 were positioned diametrically opposite one another. The annular heat-insulating body was covered by an aluminium foil 16 of a thickness of 0.5 mm. The aluminium foil 16 defined a flap of a width of 4 cm. The strip 14 of water transport-allowing material was made from non-woven fleece material and had a width of 6 cm and a length of 37 cm.

Although the present invention has been described with reference to specific, presently preferred embodiments of a heat-insulating assembly and techniques of draining or removing condensed water from the outer surface of a tubular body, such as a pipe, numerous modifications and alternative embodiments are obvious to a person having ordinary skill in the art. Consequently, the above detailed description is by no means to be construed limiting the scope of the present invention as defined in the appending claims. Furthermore, the above embodiments and techniques are readily combinable in numerous alternatives.

We claim:

1. A heat-insulating assembly for insulating a surface of a tubular body relative to the ambient air, comprising:
    a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and
    a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material.

2. The heat-insulating assembly according to claim 1, said water transport-allowing material of said strip being a capillary suction material.

3. The heat-insulating assembly according to claim 1, said annular heat-insulating body comprising mineral fibers.

4. The heat-insulating assembly according to claims 1, further comprising a sealing means for sealing said through-going slit of said annular heat-insulating body.

5. The heat-insulating assembly according to claim 4, said sealing means being constituted by a length of a vapour-impermeable adhesive tape.

6. The heat-insulating assembly according to claim 4, said sealing means being constituted by a flap of said vapour-barrier layer extending along said through-going slit of said annular heat-insulating body and having an adhesive coating for adhering to said vapour-barrier layer in overlapping relationship therewith along said through-going slit of said annular heat-insulating body.

7. The heat-insulating assembly according to claim 1, further comprising a perforated foil of a vapour-barrier material to be applied to said vapour-barrier layer covering said exposed flaps of said strip of said water transport-allowing material of said outer cylindrical surface of said annular heat-insulating body so as to expose said flap of said strip of said water transport-allowing material through perforations of said perforated foil.

8. The heat-insulating assembly according to claim 1, said strip defining opposite first and second ends, said first end being adhered to said annular heat-insulating body at said through-going slit of said annular heat-insulating body, and said second end defining said flap of said strip for the evaporation of water transferred from said surface of said tubular body to said flap of said strip through said strip of said water transport-allowing material.

9. A method of insulating a surface of a tubular body relative to the ambient air and removing condense water from said surface of said tubular body, comprising:
    providing a heat-insulating assembly for insulating said surface of said tubular body, comprising:
        a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material; and arranging said heat-insulating assembly circumferentially encircling said tubular body so as to arrange said strip of said water transport-allowing material circumferentially encircling said surface of said tubular body, and so as to expose said flap of said strip at said outer cylindrical surface covered by said vapour-barrier layer for allowing water transferred from said surface of said tubular body through said water transport-allowing material of said strip to said flap to be evaporated.

10. The method according to claim 9, further comprising applying a sealing means of a water-impermeable material along said slit for sealing said slit relative to the ambient air.

11. The method according to claim 10, said sealing means being applied as a length of a water-impermeable adhesive tape.

12. The method according to claim 10, said sealing means being provided by a flap of said vapour-barrier layer extending along said slit of said annular heat-insulating body, and said flap being applied along said slit by adhering said flap of said vapour-barrier layer to said vapour-barrier layer in overlapping relationship therewith along said through-going slit of said annular heat-insulating body by means of an adhesive coating applied to said flap of said vapour-barrier layer.

13. The method according to claim 9, further comprising applying a perforated foil of a vapour-barrier material to said vapour-barrier layer covering said exposed flaps of said strip of said water transport-allowing material of said outer cylindrical surface of said annular heat-insulating body, so as to expose said flap of said strip of said water transport-allowing material through perforations of said perforated foil.

14. A heat-insulating assembly for insulating a surface of a tubular body relative to the ambient air, comprising:

a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material, wherein the strip of water-transport allowing material is a separate component in relation to the annular heat-insulating body.

15. The heat-insulating assembly according to claim 14, said water transport-allowing material of said strip being a capillary suction material.

16. The heat-insulating assembly according to claim 14, said annular heat-insulating body comprising mineral fibers.

17. The heat-insulating assembly according to claim 14, further comprising a sealing means for sealing through-going slit of said annular heat-insulating body.

18. The heat-insulating assembly according to claim 17, said sealing means being constituted by a length of a vapour-impermeable adhesive tape.

19. The heat-insulating assembly according to claim 17, said sealing means being constituted by a flap of said vapour-barrier layer extending along said through-going slit of said annular heat-insulating body and having an adhesive coating for adhering to said vapour-barrier layer in overlapping relationship therewith along said through-going slit of said annular heat-insulating body.

20. The heat-insulating assembly according to claim 14, further comprising a perforated foil of a vapour-barrier material to be applied to said vapour-barrier layer covering said outer cylindrical surface of said annular heat-insulating body so as to expose said flap of said strip of said water transport-allowing material through perforations of said perforated foil.

21. The heat-insulating assembly according to claim 14, said strip defining opposite first and second ends, said first end being adhered to said annular heat-insulating body at said through-going slit of said annular heat-insulating body, and said second end defining said flap of said strip for the evaporation of water transferred from said surface of said tubular body to said flap of said strip through said strip of said water transport-allowing material.

22. A method of insulating a surface of a tubular body relative to the ambient air and removing condense water from said surface of said tubular body, comprising:

providing a heat-insulating assembly for insulating said surface of said tubular body, comprising:

a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material, wherein the strip of water-transport allowing material is a separate component in relation to the annular heat-insulating body; and arranging said heat-insulating assembly circumferentially encircling said tubular body so as to arrange said strip of said water transport-allowing material circumferentially encircling said surface of said tubular body, and so as to expose said flap of said strip at said outer cylindrical surface covered by said vapour-barrier layer for allowing water transferred from said surface of said tubular body through said water transport-allowing material of said strip to said flap to be evaporated.

23. The method according to claim 22 further comprising applying a sealing means of a water-impermeable material along said slit for sealing said slit relative to the ambient air.

24. The method according to claim 23, said sealing means being applied as a length of a water-permeable adhesive tape.

25. The method according to claim 23, said sealing means being provided by a flap of said vapour-barrier layer extending along said slit of said annular heat-insulating body, and said flap being applied along said slit by adhering said flap of said vapour-barrier layer to said vapour-barrier layer in overlapping relationship therewith along said through-going slit of said annular heat-insulating body by means of an adhesive coating applied to said flap of said vapour-barrier layer.

26. The method according to claim 22, further comprising applying a perforated foil of a vapour-barrier material to said vapour-barrier layer covering said outer cylindrical surface of said annular heat-insulating body, so as to expose said flap of said strip of said water transport-allowing material through perforations of said perforated foil.

27. A heat-insulating assembly for insulating a surface of a tubular body relative to the ambient air, comprising:
a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material, wherein the strip of water-transport allowing material has one end fixated to the heating-insulating body at a position adjacent to the through-going slit.

28. A method of insulating a surface of a tubular body relative to the ambient air and removing condense water from said surface of said tubular body, comprising:
providing a heat-insulating assembly for insulating said surface of said tubular body, comprising:
a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body; and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating body to be exposed to the ambient air for the evaporation of water transferred from said surface of said tubular body to said flap of said strip through said strip of said water transport-allowing material, wherein the strip of water-transport allowing material has one end fixated to the heating-insulating body at a position adjacent to the through-going slit; and arranging said heat-insulating assembly circumferentially encircling said tubular body so as to arrange said strip of said water transport-allowing material circumferentially encircling said surface of said tubular body, and so as to expose said flap of said strip at said outer cylindrical surface covered by said vapour-barrier layer for allowing water transferred from said surface of said tubular body through said water transport-allowing material of said strip to said flap to be evaporated.

29. The heat-insulating assembly according to claim 27, said water transport-allowing material of said strip being a capillary suction material.

30. The heat-insulating assembly according to claim 27, said annular heat-insulating body comprising mineral fibers.

31. The heat-insulating assembly according to claim 27, further comprising a sealing means for sealing through-going slit of said annular heat-insulating body.

32. The heat-insulating assembly according to claim 1, said sealing means being constituted by a length of a vapour-impermeable adhesive tape.

33. The heat-insulating assembly according to claim 31, said sealing means being constituted by a flap of said vapour-barrier layer extending along said through-going slit of said annular heat-insulating body and having an adhesive coating for adhering to said vapour-barrier layer in overlapping relationship therewith along said through-going slit of said annular heat-insulating body.

34. The heat-insulating assembly according to claim 27, further comprising a perforated foil of a vapour-barrier material to be applied to said vapour-barrier layer covering said exposed flaps of said strip of said water transport-allowing material of said outer cylindrical surface of said annular heat-insulating body so as to expose said flap of said strip of said water transport-allowing material through perforations of said perforated foil.

35. The heat-insulating assembly according to claim 27, said strip defining opposite first and second ends, said first end being adhered to said annular heat-insulating body at said through-going slit of said annular heat-insulating body, and said second end defining said flap of said strip for the evaporation of water transferred from said surface of said tubular body to said flap of said strip through said strip of said water transport-allowing material.

36. The method according to claim 28, further comprising applying a sealing means of a water-impermeable material along said slit for sealing said slit relative to the ambient air.

37. The method according to claim 36, said sealing means being applied as a length of a water-permeable adhesive tape.

38. The method according to claim 36, said sealing means being provided by a flap of said vapour-barrier layer extending along said slit of said annular heat-insulating body, and said flap being applied along said slit by adhering said flap of said vapour-barrier layer to said vapour-barrier layer in overlapping relationship therewith along said through-going slit of said annular heat-insulating body by means of an adhesive coating applied to said flap of said vapour-barrier layer.

39. The method according to claim 28, further comprising applying a perforated foil of a vapour-barrier material to said vapour-barrier layer covering said exposed flaps of said strip of said water transport-allowing material of said outer cylindrical surface of said annular heat-insulating body, so as to expose said flap of said strip of said water transport-allowing material through perforations of said perforated foil.

* * * * *

UNITED STATES PATENT AND TRADEMARK OFFICE
CERTIFICATE OF CORRECTION

PATENT NO. : 5,690,147
DATED : November 25, 1997
INVENTOR(S) : Cridland et al.

It is certified that error appears in the above-identified patent and that said Letters Patent is hereby corrected as shown below:

Col. 3, line 57: "prefebly" should read --preferably--

Col. 4, line 38: "condence" should read --condense--

Col. 5, line 26: "rectalinear" should read --rectilinear--

Col. 5, line 30: insert --:-- after the word "which"

Col. 5, line 45: "view" should read --views--

Col. 6, line 15: "contituting" should read --constituting--

Col. 8, line 48: "satisfactory" should read --satisfactorily--

Col. 8, line 61: "diagramme" should read --diagram--

UNITED STATES PATENT AND TRADEMARK OFFICE
CERTIFICATE OF CORRECTION

PATENT NO.   : 5,690,147
DATED        : November 25, 1997
INVENTOR(S)  : Cridland et al.

It is certified that error appears in the above-identified patent and that said Letters Patent is hereby corrected as shown below:

Col. 9, line 3: "diagramme" should read --diagram--

Col. 10, line 26, claim 4: "claims" should read --claim--

Col. 15, line 14, claim 36: "scaling" should read --sealing--

Signed and Sealed this

Fourteenth Day of March, 2000

Attest:

Attesting Officer

Q. TODD DICKINSON

Commissioner of Patents and Trademarks